United States Patent [19]
Benoit

[11] Patent Number: 5,713,542
[45] Date of Patent: Feb. 3, 1998

[54] LOCATOR TIE

[75] Inventor: James C. Benoit, Needham, Mass.

[73] Assignee: Avery Dennison Corporation, Pasadena, Calif.

[21] Appl. No.: 500,785

[22] Filed: Jul. 11, 1995

[51] Int. Cl.[6] ............................................. F16B 15/00
[52] U.S. Cl. ................................. 248/71; 248/74.3
[58] Field of Search ........................ 248/74.3, 74.2, 248/74.1, 316.7, 71, 224.8, 223.41, 223.51, 223.61; 24/16 PB, 17 AP, 30.5 P

[56] References Cited

U.S. PATENT DOCUMENTS

| | | |
|---|---|---|
| 2,936,980 | 5/1960 | Rapata. |
| 3,302,913 | 2/1967 | Collyer et al. |
| 3,471,109 | 10/1969 | Meyer. |
| 3,667,710 | 6/1972 | Moody et al. ............... 248/74.3 X |
| 3,758,060 | 9/1973 | Schuplin. |
| 4,272,047 | 6/1981 | Botka. |
| 4,272,870 | 6/1981 | McCormick. |
| 4,441,677 | 4/1984 | Byerly ........................ 248/74.3 |
| 4,490,886 | 1/1985 | Omata. |
| 4,490,887 | 1/1985 | Sarton et al. |
| 4,501,049 | 2/1985 | Adamson. |
| 4,564,163 | 1/1986 | Barnett ....................... 248/74.3 X |
| 4,640,479 | 2/1987 | Shely et al. ................. 248/74.3 X |
| 4,669,688 | 6/1987 | Itoh et al. |
| 4,784,358 | 11/1988 | Kohut ........................ 248/74.3 |
| 5,079,802 | 1/1992 | Blase et al. ................. 24/16 PB X |
| 5,112,013 | 5/1992 | Tolbert et al. ............... 248/74.3 |
| 5,333,822 | 8/1994 | Benoit et al. ............... 248/74.3 X |
| 5,390,876 | 2/1995 | Hatano et al. ............... 248/74.1 X |

*Primary Examiner*—Ramon O. Ramirez
*Assistant Examiner*—Willie Berry, Jr.
*Attorney, Agent, or Firm*—Kriegsman & Kriegsman

[57] ABSTRACT

A locator tie for use in securing a cable to a wall having an aperture, the cable including a tubular sheath having longitudinally spaced apart annular grooves on the outer surface thereof. The locator tie includes a fastener and a cable tie, the cable tie being integrally formed with the fastener. The fastener includes an arrowhead mounted on a support and surrounded by a spring-biased basket. The cable tie includes a strap having an inner surface and an outer surface and includes a head portion and a tail portion. The fastener is disposed between the head portion and the tail portion of the strap. The head portion of the strap includes a longitudinal rib located near the basket receivable in an annular groove when the strap is wrapped around a cable to prevent movement of the cable reactive the strap. The rib is shaped to include three pairs of inwardly tapered sidewalls which enable the cable tie to be secured against movement with a variety of tubular sheath sizes.

4 Claims, 4 Drawing Sheets

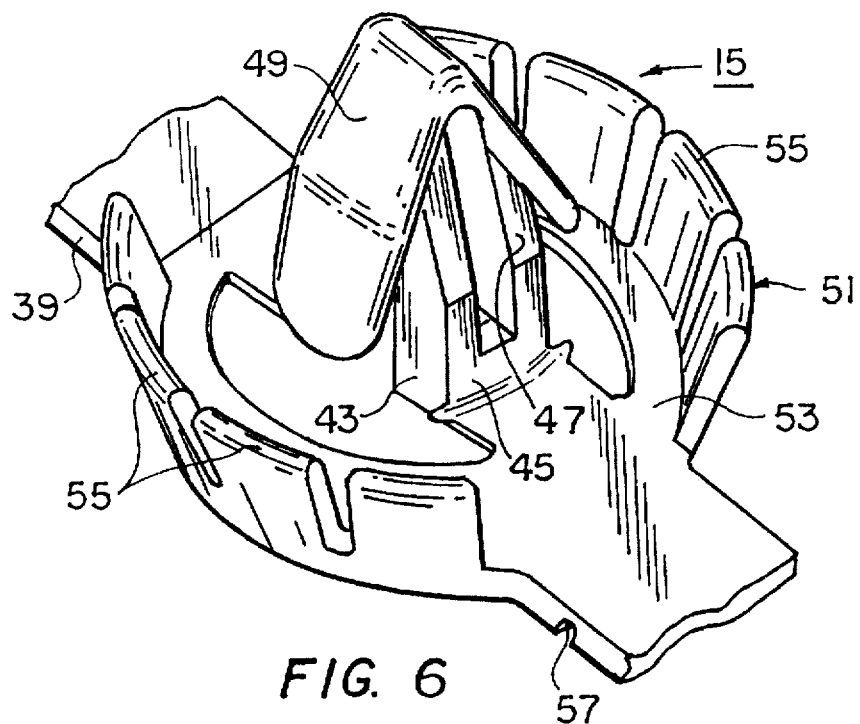
FIG. 6
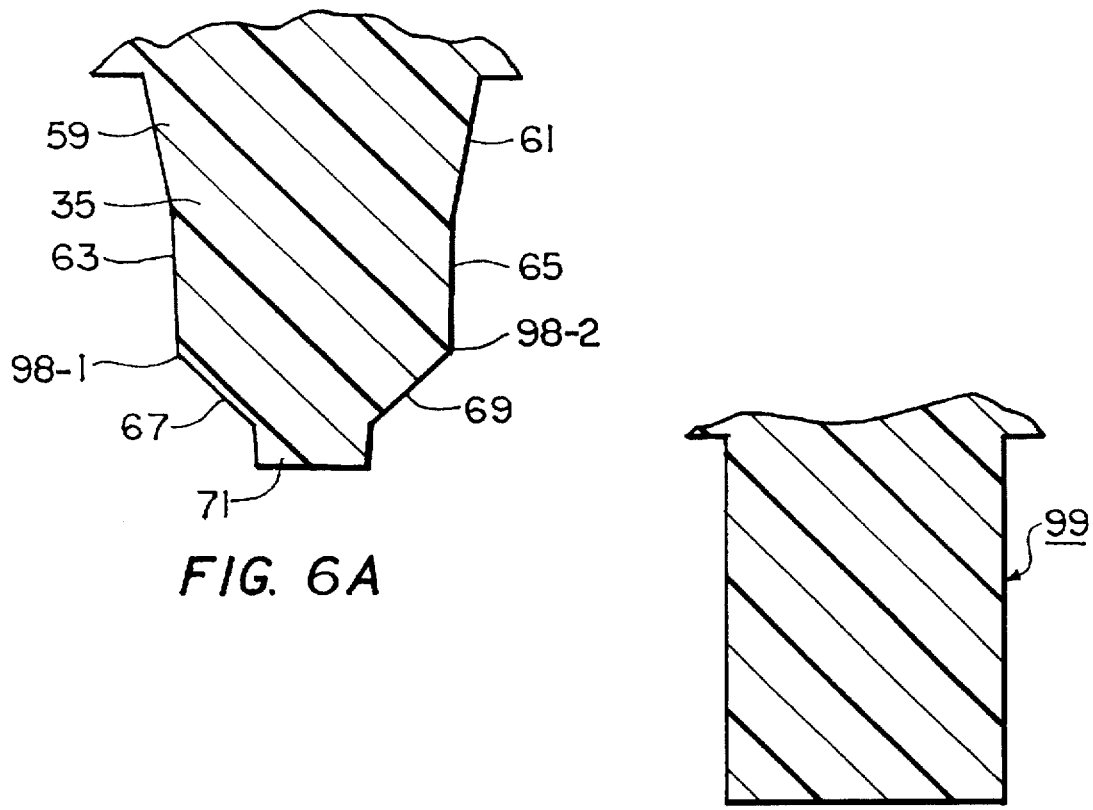
FIG. 6A
FIG. 11

5,713,542

1

LOCATOR TIE

FIELD OF THE INVENTION

The present invention relates to a locator tie for securing a cable to a wall.

BACKGROUND OF THE INVENTION

In U.S. Pat. No. 5,333,822 to James C. Benoit and Charles L. Deschenes, which patent is incorporated herein by reference, there is disclosed a locator tie for attaching an element, such as a bundle of electrical wires, to a thin wall having an aperture. The locator tie is made of plastic and comprises a cable tie capable of surrounding and engaging the element and a fastener integrally formed with the cable tie, the fastener being adapted so that it can be easily inserted into the aperture but removed from the aperture only with great difficulty. The fastener includes an arrowhead mounted on a support and surrounded by a spring-biased basket. The cable tie includes a strap having a head portion which is on one side of the fastener and a tail portion which is on the other side of the fastener. The head portion includes an engagement head and the tail portion includes an engagement surface, which, when fed through the engagement head is locked in the engagement head and cannot thereafter be extracted. The strap also includes a pair of holding blocks, one on the head portion of the strap and the other on the tail portion of the strap and the other on the tail portion of the strap for engaging a corrugated socket which surrounds the bundle of electrical wire.

In U.S. Pat. No. 4,784,358 to James K. Kohut there is disclosed a cable strap which is provided for securing a cable to a panel. The cable includes a tubular sheath having longitudinally spaced apart annular grooves on the outer surface thereof. The cable strap comprises a flexible strap having a buckle at one end for reception of the other end of the strap to secure the cable strap to the cable. A fastener is provided on the outer surface of the strap for securement to a panel. Teeth are provided on the inner surface of the strap to engage the tubular sheath and prevent rotation or movement longitudinally of the sheath with respect to the cable trap.

Another patent of interest is U.S. Pat. No. 3,471,109 is Engelbert A. Meyer.

SUMMARY OF THE INVENTION

It is an object of this invention to provide a new and improved locator tie.

It is another object of this invention to provide a locator tie for securing a cable to a wall, the cable including a tubular sheath having annular grooves.

It is still another object of this invention to provide a locator tie as described above which is designed to reduce slippage of the cable relative to the locator tie.

A locator tie constructed according to this invention is made of plastic and includes a fastener and a cable tie, the cable tie comprising a strap having a head portion and a tail portion, each portion including an outer surface and an inner surface, the fastener being disposed between the head portion and the tail portion of the strap, the strap including an elongated rib on its inner surface receivable in an annular groove in the tubular sheath to reduce slippage when the strap is wrapped around a cable.

Various features and advantages will appear from the description to follow. In the description, reference is made to the accompanying drawing which forms a part thereof, and

2 in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

The invention, may be best understood by reference to the accompanying drawings, in which like reference numerals represent like parts and wherein:

FIG. 6 is an enlarged fragmentary perspective view taken from the top locator tie shown in FIG. 2;

FIG. 6A is an enlarged cross-section view of the rib in the locator tie shown in FIG. 3;

FIG. 11 is a lateral section view of a modification of the rib shown in the locator tie shown in FIG. 2.

DETAILED DESCRIPTION OF THE PREFERRED EMBODIMENTS

Figure 1:
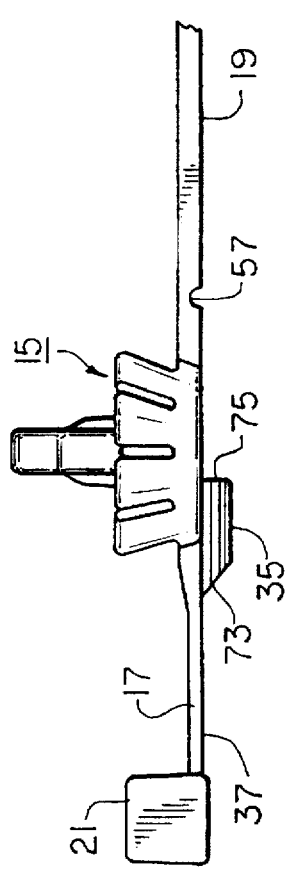
FIG. 1 is a fragmentary perspective view of one embodiment of a locator tie according to this invention illustratively wrapped around a cable.
Figure 3:
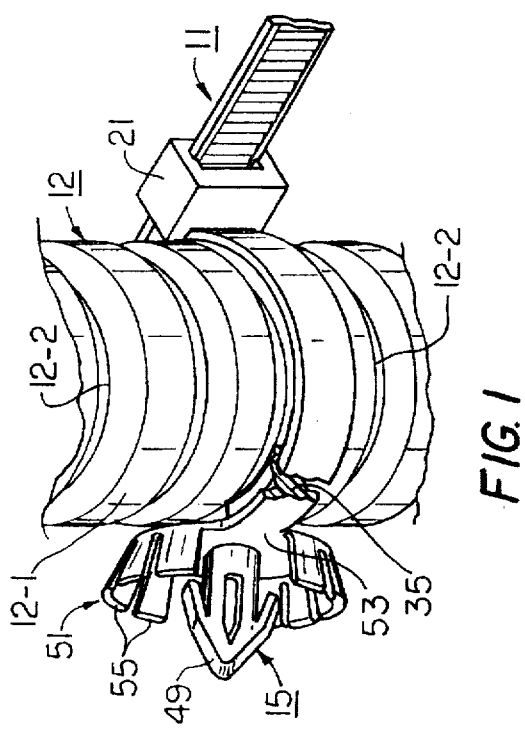
FIG. 3 is a fragmentary side view of the locator tie shown in FIG. 2.
Figure 2:
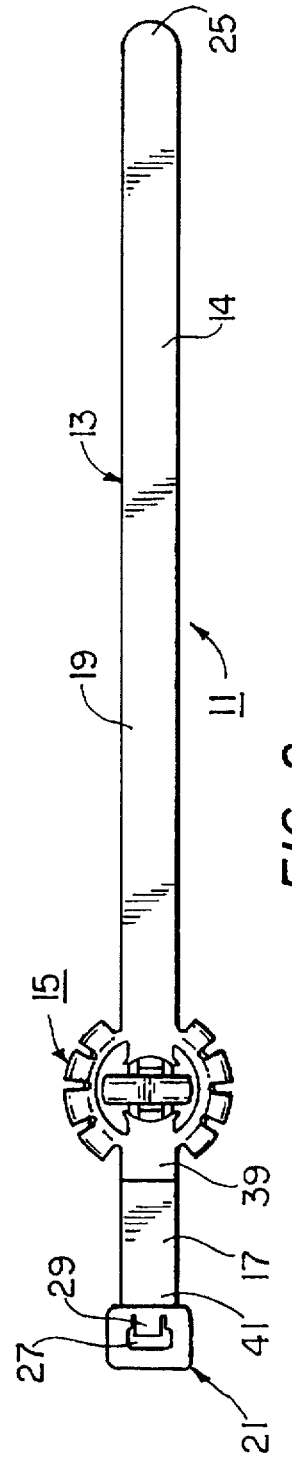
FIG. 2 is a top view of the locator tie shown in FIG. 1.

Referring now to the drawings, there is shown a locator tie, designated generally by the numeral 11, constructed according to this invention.

Locator tie 11 is constructed for use in securing a cable 12 to a wall having an aperture. Cable 12 includes a tubular sheath 12-1 having longitudinally spaced apart annular grooves 12-2 on its outer surface. Tubular sheath 12-1 encloses a bundle of electrical wires.

Figure 4:
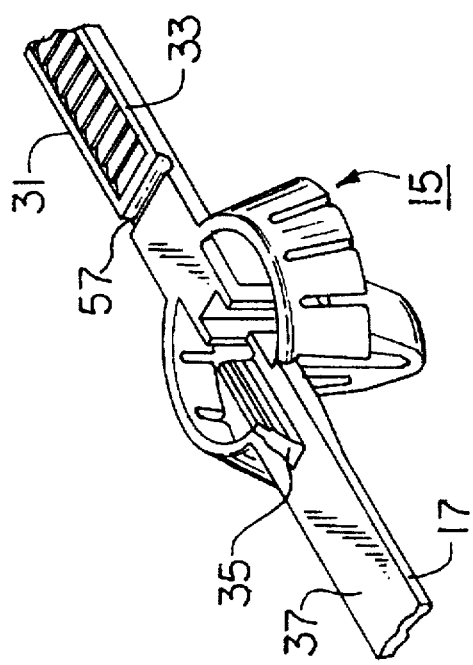
FIG. 4 is an enlarged fragmentary perspective view taken from the bottom of the locator tie shown in FIG. 2.
Figure 5:
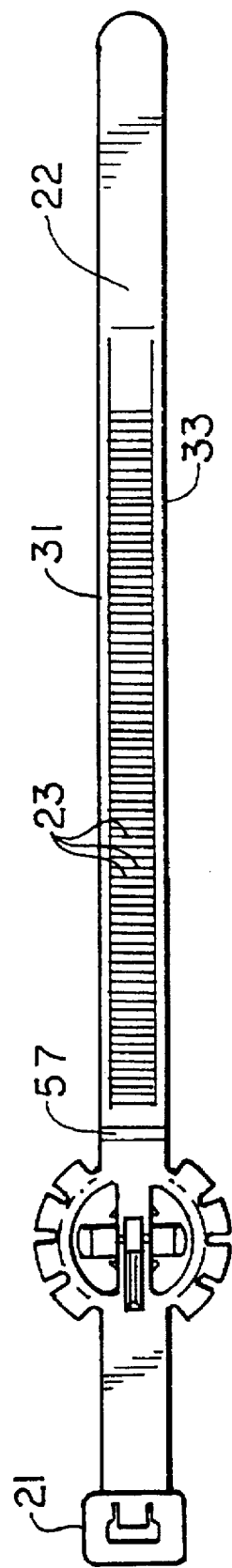
FIG. 5 is a bottom view of the locator tie shown in FIG. 2.

Locator tie 11 is an integrally formed structure made of a plastic such as nylon and includes a cable tie 13 and a fastener 15. Locator tie 11 may be made by injection molding. Cable tie 13 includes a strap 14 having a head portion 17 and a tail portion 19. Head portion 17 carries an engagement head 21 at its outer end. On the inner surface 22 of tail portion 19, as best shown in FIG. 4, are a series of serrations 23 which are designed so that when the free end 25 of tail portion 19 is fed through an engagement opening 27 in engagement head 21, a pawl 29 within engagement head 21 locks onto one of serrations 23 and prevents extraction of tail portion 19 from opening 27 in engagement head 21. A pair of rails 31 and 33 are integrally formed on either side of serrations 23. An elongated rib 35 is provided on the inner surface 37 of head portion 17. The function of rib 35 is to grip sheath 12-1 and prevent turning of sheath 12-1 within strap 14 and also prevent sliding of strap 14 along the length of sheath 12-1.

Fastener 15 is a pushmount type fastener and is positioned near, but spaced from, the engagement head 21. The separation and resulting flexibility between the engagement head 21 and the fastener 15 helps to diffuse the flexing stresses along the length of head portion 17 of strap 14. This effect is enhanced by making the portion 39 of head portion 17 of strap 14 near the fastener 15 thicker than the portion 41 near engagement head 21.

Fastener 15 includes a support 43 which is connected to strap 13 of cable tie 11 at its base end 45. Support 43 also has an upper end 47 which extends up from strap 13. Mounted on upper end 47 of support 43 is a unitary, two-bladed arrowhead 49. Surrounding arrowhead 49 is a spring-biassed basket 51 which includes a base 53 which is integral with a part of the plane of the strap 13, and a plurality of spring fingers 55 which extend up from the base 53.

Fastener 15 is identical in construction to fastener 12 shown in U.S. Pat. No. 5,333,822.

In order to provide bend relief to enable strap 14 to bend without breaking when it is wrapped around cables, especially small diameter cables, and also to relieve the bending stress produced in basket 51 of fastener 15 when strap 14 is wrapped around small diameter cables, an area of weakness in the form of a transversely extending groove 57 is provided on the undersurface of tail portion 19 of strap 14 between holding block 37 and serrations 23. As can be seen, groove 57, which may be for example, semicircular in cross section, extends fully across undersurface 22 of strap 14. The depth of groove 57 is at least equal to an preferably deeper than the depth of serrations 23 so as to cause a weaker section in tail portion 14 of strap 13, thereby allowing groove 57 in tail portion 14 of strap 13 to bend and absorb the stress rather than basket 51 or other areas on tail portion 14.

Except for rib 35 and groove 57, strap 14 is identical in construction to strap 13 shown in U.S. Pat. No. 5,333,822.

As can be seen, rib 35 is longitudinally disposed on inner surface 37 of head portion 17 of strap 14 in the vicinity of basket 51 and includes a first pair of inwardly tapered sidewalls 59 and 61 extending down from inner surface 37, a second pair of inwardly tapered sidewalls 63 and 65 extending down from sidewalls 59 and 61 respectively and a third pair of inwardly tapered sidewalls 67 and 69 extending down from sidewalls 63 and 65 respectively. Rib 35 also includes a projection 71 extending out from sidewalls 67 and 69 to assist in easily inserting the rib into an annular groove in a sheath. Rib 35 further includes an outer end 73 which is tapered inward so as to not interfere with head portion of strap 14 as it is bent around a sheath and an inner end 75 which extends straight down from undersurface 37 to maximize the contact surface area of the rib.

The unique cross-sectional shape of rib 35 enables locator tie 11 to accommodate a wide variety of convoluted tubing i.e. sheath sizing. One purpose of rib 35 is to prevent tie 11 from sliding along the longitudinal axis of the sheath. Another purpose of rib 35 is to restrict rotation of tie 11 relative to the sheath. In use, rib 35 is wedged in against the sidewalls of an annular groove.

FIGS. 7 through 10 show how rib 35 is wedged into annular grooves of different sizes, the annular grooves being identified by reference numerals 77, 79, 81 and 83 respectively; groove 79 being larger than groove 77, groove 81 being larger than groove 79 and groove 84 being larger than groove 81. Groove 77 includes top edges 83 and 85. Groove 79 includes top edges 87 and 89. Groove 81 includes top edges 91 and 93. Groove 83 includes top edges 95 and 97. As can also be seen, in each of FIGS. 7–10, rib 35 only extends partially into the groove.

Figure 7:
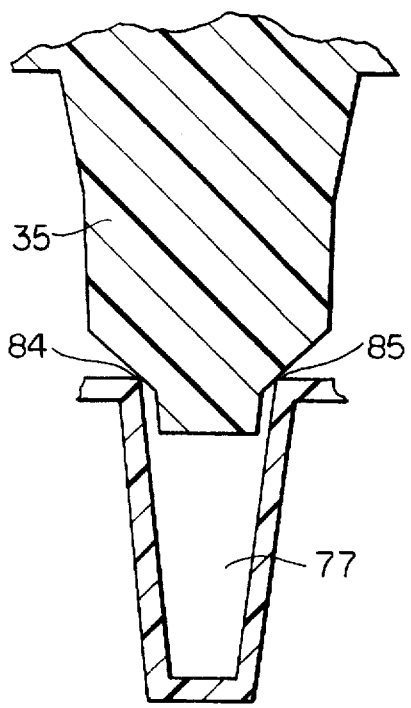
FIG. 7 is a section view showing how the rib portion of the strap in the locator tie shown in FIG. 2 is received in an annular groove of a cable sheath of one particular size.
Figure 8:
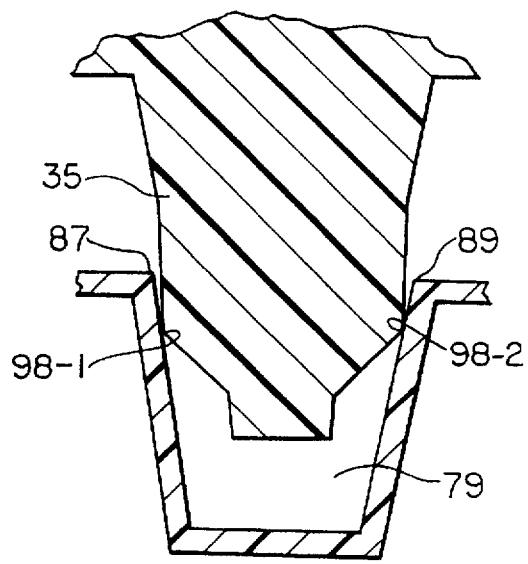
FIG. 8 is a section view showing how the rib portion of the strap in the locator tie shown in FIG. 2 is received in an annular groove of a cable sheath, the annular groove being larger than the annular groove in the cable sheath in FIG. 7.
Figure 9:
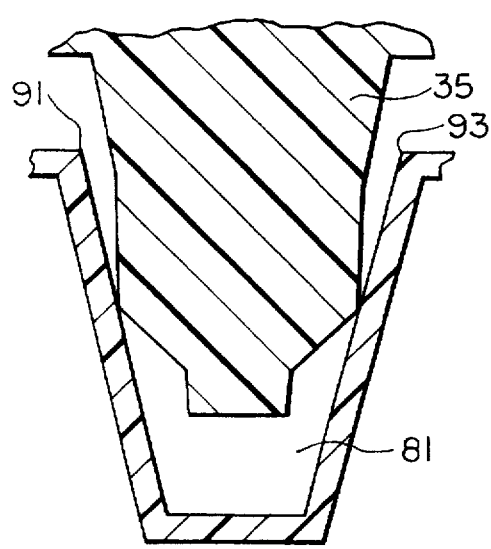
FIG. 9 is a section view showing how the rib portion of the strap in the locator tie shown in FIG. 2 is received in an annular groove of a cable sheath, the annular groove being larger than the annular groove in the cable sheath in FIG. 8.
Figure 10:
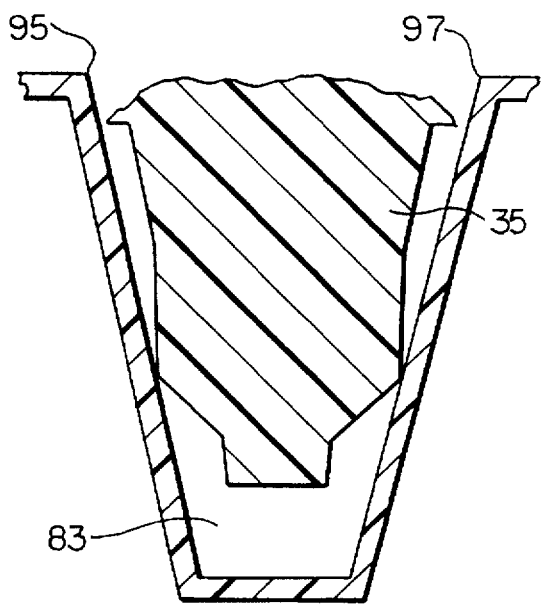
FIG. 10 is a section view showing how the rib portion of the strap in the locator tie shown in FIG. 2 is received in an annular groove of a cable sheath, the annular groove being larger than the annular groove in the cable sheath in FIG. 9.

As can also be seen in FIG. 7, sidewalls 67 and 69 wedge against edges 84 and 85 of groove 75 while in FIGS. 8–10 corners 98-1 and 98-2 wedge in against the sides of the grooves into which rib 35 is inserted.

A modification of rib 35 is shown in FIG. 11 and identified by reference numeral 99. Rib 99 prevents sliding movement of the tie along the sheath.

The embodiments of the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A locator tie for use in securing a cable to a wall, the cable including a tubular sheath having longitudinally spaced apart annular grooves on the outer surface thereof, the locator tie comprising:

a. a fastener attachable to the wall, and b. a cable tie integrally formed with the fastener, the cable tie comprising a strap having a head portion and a tail portion, each portion having an inner surface, c. the fastener being disposed between the head portion and the tail portion of the strap, d. the strap including an elongated rib longitudinally disposed on its inner surface, said elongated rib being sized and shaped to be received and wedge itself within an annular groove in the tubular sheath of the cable when the strap is wrapped around the cable to prevent rotational movement of the tubular sheath within the strap and to prevent longitudinal movement of the strap along the tubular sheath, said elongated rib having a plurality of pairs of tapered sidewalls disposed one below the other to enable the elongated rib to accommodate tubular sheaths of different dimensions.

2. The locator tie of claim 1, wherein the rib is on the head portion of the strap.

3. The locator tie of claim 2, wherein the rib further includes a projection to assist in inserting the rib into the annular groove on the sheath.

4. The locator tie of claim 1 wherein there are three pairs of sidewalls.

* * * * *